(12) United States Patent
Kohlgrüber

(10) Patent No.: US 8,074,371 B2
(45) Date of Patent: Dec. 13, 2011

(54) PROCESS AND APPARATUS FOR REMOVING VOLATILE SUBSTANCES FROM HIGHLY VISCOUS MEDIA

(75) Inventor: Klemens Kohlgrüber, Kürten (DE)

(73) Assignee: Bayer Technology Services GmbH, Leverkusen (DE)

( * ) Notice: Subject to any disclaimer, the term of this patent is extended or adjusted under 35 U.S.C. 154(b) by 1693 days.

(21) Appl. No.: 10/896,241

(22) Filed: Jul. 20, 2004

(65) Prior Publication Data
US 2005/0092444 A1 May 5, 2005

(30) Foreign Application Priority Data

Jul. 24, 2003 (DE) .................................. 103 33 577

(51) Int. Cl.
*F26B 11/05* (2006.01)

(52) U.S. Cl. ........ 34/60; 34/80; 34/90; 165/51; 165/156

(58) Field of Classification Search ................ 34/86, 38, 34/381, 90, 60, 77, 78, 80, 95, 105, 210, 34/218; 159/47.1; 422/109; 165/96, 51, 165/156
See application file for complete search history.

(56) References Cited

U.S. PATENT DOCUMENTS

| | | | | |
|---|---|---|---|---|
| 3,358,749 A | * | 12/1967 | Chisholm et al. | 165/141 |
| 3,394,924 A | * | 7/1968 | Harder | 366/338 |
| 3,404,869 A | * | 10/1968 | Harder | 366/338 |
| 4,024,619 A | | 5/1977 | Jonason | 29/157.3 R |
| 4,153,501 A | * | 5/1979 | Fink et al. | 159/49 |
| 4,294,652 A | * | 10/1981 | Newman | 159/2.1 |
| 4,548,788 A | * | 10/1985 | Morris et al. | 422/109 |
| 4,667,734 A | | 5/1987 | Längle | 165/145 |
| 5,084,134 A | * | 1/1992 | Mattiussi et al. | 159/47.1 |
| 6,129,147 A | | 10/2000 | Dumetz et al. | 165/177 |
| 2002/0092625 A1 | | 7/2002 | Kohlgruber et al. | 159/43.1 |

FOREIGN PATENT DOCUMENTS

| | | |
|---|---|---|
| DE | 805 785 A1 | 5/1951 |
| DE | 25 06 434 A1 | 8/1975 |
| DE | 32 12 727 A1 | 9/1983 |
| DE | 198 57 510 | 7/1999 |
| DE | 101 44 233 A1 | 7/2002 |
| EP | 0 218 104 A1 | 4/1987 |
| EP | 0 226 204 * | 6/1987 |
| EP | 0 772 017 A1 | 5/1997 |

* cited by examiner

*Primary Examiner* — Stephen M. Gravini

(74) *Attorney, Agent, or Firm* — Norris McLaughlin & Marcus PA

(57) ABSTRACT

Evaporator apparatus (1) for the treatment of viscous media comprised of at least a feed chamber (2) having a perforated tray (3), a tube-bundle heat exchanger (4) connected thereto having perpendicularly arranged tubes (8) and a devolatilization chamber (5) connected thereto, a discharge unit (6) for the product and a vapor take-off (7) for removing volatile components, the tubes (8) of the heat exchanger (4) having a rectangular cross section over the greater part of their length.

36 Claims, 4 Drawing Sheets

A - A

D - D

E - E

PROCESS AND APPARATUS FOR REMOVING VOLATILE SUBSTANCES FROM HIGHLY VISCOUS MEDIA

The invention relates to a continuous process for particularly gentle heating or concentration of polymer solutions or polymer melts, in particular of thermoplastic polymers, using a tube-bundle heat exchanger comprising compact tubes having flat channels and a cross section variable over the length and a downstream separator, and to an apparatus for carrying out this process.

BACKGROUND OF THE INVENTION

The tube-bundle heat exchangers described in industry are used for heating or cooling fluids and for vaporizing volatile substances from viscous media. They usually consist of tubes through which the medium to be devolatilized or to be heated flows and around the outside of which a heating medium flows. The apparatuses are referred to, for example, as flat-tube heat exchangers, falling-tube evaporators or flat-tube evaporators. Fields of use of tube-bundle heat exchangers are, for example, evaporators for polymer solutions, air conditioning systems or refrigerators.

EP 0772017 A1 describes a heat exchanger tube for use in tube-bundle heat exchangers, preferably in condensing boilers for cooling heating gases. The tube has an approximately circular cross section at its ends and an oval or rectangular cross section in the tube part located in between, which cross section may be constant or variable. The inside of the tube is provided with beads, grooves or indentations in order to generate a turbulent boundary layer and to improve the heat transfer. However, the generation of turbulent flow with the aid of indentations, etc. does not work in the case of the highly viscous polymer melts exhibiting laminar flow.

The tube-bundle heat exchanger apparatus described in EP 0218104 A1 operates in the low-pressure range according to the cross counterflow principle and is used for gas/gas and liquid systems, in particular for combustion processes with large amounts of gas and high waste gas temperatures and for processes in which a solvent circulates. The apparatus consists of tubes which have a hexagonal cross-sectional profile at their ends and an elliptical or round cross section in the middle part (about 90% of the tube length). The advantage of the hexagonal profile is that the tube ends can be joined directly to one another and a tight cavity thus forms between the tubes without preperforated end trays being required. However, this design is disadvantageous when the side walls of the heat exchanger jacket are connected to the joined tubes. It is necessary to weld on prepunched metal sheets which simulate the contour of the tubes joined to one another.

The heat exchanger described in DE 3212727 A1 (corresponding to U.S. Pat. No. 4,667,734) and intended for cooling or heating highly viscous, in particular structurally viscous, flowable substances consists of rows of parallel tubes which are arranged offset by 90° in planes parallel to one another. The heating or cooling medium flows in the tubes, and the fluid to be heated or to be cooled flows on their outside, perpendicular to the plane of the rows of tubes. The tubes are in the form of round or flat tubes. A disadvantage of this arrangement is that many "dead spaces" exist between the intersecting tubes, in which dead spaces the medium to be heated or to be cooled collects and undergoes thermal decomposition. Moreover, this design is very complicated and difficult to scale up for larger production plants.

A brochure of Schrader Verfahrenstechnik GmbH discloses a flat-tube heat exchanger. This flat-tube heat exchanger is used for condensing vapors or as a heating element in concentration plants. The apparatus described is a tube-bundle heat exchanger which consists of a heat exchanger jacket in which flat tubes arranged in rows are present.

Improved heat transfer and less fouling in comparison with round tubes are mentioned as advantages.

An application for polymers or polymer melts is not known.

Heat exchanger tubes having flat, oval or elliptical cross section and the production thereof are described in the prior art. DE 805 785 A1, for example, discloses a plate-type heating element which has a largely rectangular cross section. The plate-type heating element is however produced by bending over the two sides of a metal sheet and welding in further metal strips and stiffening profiles. This apparatus is taken as a basis in DE 2 506 434 A1 (corresponding to U.S. Pat. No. 4,024,619), the heat exchanger tube being produced from a single metal strip by bending over, and a supporting flange being integrated. The overlapping ends are then welded. A similar flat tube is described in DE 19 857 510 (corresponding to U.S. Pat. No. 6,129,147), but here the supporting flange consists of an edge of the metal strip which is bent from the surface of the tube to the tube interior and back again so that two chambers form. The publication DE 7 837 359 describes a flat heat exchanger tube which, in contrast to the abovementioned one, ensures strong and liquid-tight connection in the overlap region over the entire period of use of the tube.

A disadvantage of all designs mentioned is the complicated production of the tubes, at least one shaping and one joining process being necessary. It is an object of the invention to use a compact tube in which only one shaping process is necessary. Moreover, it is intended to dispense with the joint seam, which can lead to disadvantageous changes in the melt flow.

It is therefore the object of the invention to remove volatile substances from highly viscous polymer solutions or melts under particularly gentle conditions, i.e. with as low a thermal load as possible (temperature and residence time) and narrow residence time distribution, and to provide a suitable apparatus which does not have the disadvantages of the known heat exchangers.

SUMMARY OF THE INVENTION

This object is achieved, according to the invention, by passing a polymer solution or melt continuously through a tube-bundle heat exchanger comprised of compact tubes and heating said solution or melt to a temperature above the boiling point of the volatile substances. The volatile substances are then separated off in a downstream separator (devolatilization chamber) from the polymer solution or melt, and the devolatilized polymer melt is transported further through a discharge apparatus, for example a gear pump (e.g. for granulation).

DETAILED DESCRIPTION

The invention relates to an evaporator apparatus for the treatment of viscous media, comprising at least a feed chamber having a perforated tray, a tube-bundle heat exchanger connected thereto and having perpendicularly arranged tubes, and a devolatilization chamber connected thereto and having a discharge unit for the product and a vapor take-off for removing volatile components, wherein the tubes of the heat exchanger have a rectangular or elliptical cross section over the greater part of their longitudinal dimension.

In particular, the invention relates to an evaporator apparatus (1) comprising a heat exchanger (4), which heat exchanger is comprised of a plurality of parallel heat exchanger tubes (8) surrounded by a jacket (10), in which each of the heat exchanger tubes has a first end and a second end, the first ends of the heat exchanger tubes being terminated at a first perforated tray (3) and the second ends being terminated at a second perforated tray (9), a feed chamber adjoining the first perforated tray and a devolatilization chamber adjoining the second perforated tray, the feed chamber having an inlet, the devolatilization chamber having a discharge and a vapor outlet and the jacket having an inlet and an outlet for heat transfer media, wherein the heat exchanger tubes have a rectangular or elliptical cross-section over the greater part of their lengths.

In the context of the invention, the term rectangular cross section includes rectangular cross sections having rectangular and rounded edge shapes. Rectangular cross sections having rounded edges or elliptical cross sections are preferred.

In the context of the invention, the term greater part means more than one-half.

The tubes are characterized by their interior dimensions of thickness D and width B, and preferably have a rectangular or elliptical cross section over 80 to 98% of their longitudinal dimension.

The rectangular or elliptical cross-sections of the tubes are characterized by their interior dimensions of thickness (i.e., height) D and width B, wherein the maximum interior thickness of the rectangular or elliptical cross section is preferably 1 to 50 mm, particularly preferably 1 to 20 mm.

The maximum width B of the interior of the rectangular or elliptical cross section is in particular 5 to 500 mm, preferably 7 to 100 mm, particularly preferably 7 to 50 mm.

The ratio of maximum width B to maximum thickness D is in particular 2:1 to 30:1, particularly preferably 4:1 to 10:1.

The tubes preferably have a length of 100 mm to 10 m, preferably of 200 mm to 3 m, particularly preferably of 500 mm to 1 m.

In a preferred embodiment, the tubes have a wall thickness of 0.5 to 5 mm, preferably of 1 to 4 mm.

The tubes can be obtained, for example, by rolling tubes having a circular cross section.

In a particular embodiment, vertical wires, chains, wire loops or wire braids are attached to the ends of the tubes of the heat exchanger, in the devolatilization chamber.

These serve as means for increasing the size of the phase boundary between, for example, polymer to be devolatilized and the gas space, in order to accelerate vapor expulsion processes.

Suitable arrangements of wires, wire loops or wire braids are disclosed, for example, in U.S. 2002/0092625, (corresponding to DE 10 144 233 A1), the content of which is hereby incorporated by reference.

Sharp edges (corners) with possible dead corners for the product are avoided in the invention. The danger of nonuniform distribution of the product flow is less in an elliptical tube than in a flat tube.

The tube can be made circular in the usual manner at the tube ends, with the result that customary fastening in the plates (i.e., "tube sheets") of a tube-bundle heat exchanger is possible. Furthermore, product entrance and exit can then be designed in the same manner as is done for known tube-bundle (i.e., "shell-and-tube") heat exchangers. The transition from round to elliptical or rectangular cross section preferably takes place without sharp edges.

In a particularly preferred variant of the invention, the tube may have a plurality of zones of different cross-sectional areas. The flattening can be effected in two or more stages.

It is furthermore possible to introduce orifice plates in the region of the tube end, which are intended to keep the pressure in the tube interior approximately the same as it is at the end of the tubes. This prevents nonuniform evaporation behavior in the evaporator tubes arranged side by side. Consequently, maldistribution is prevented.

Another variant of the apparatus is also preferred in which a cross-sectional narrowing is provided in the upper inlet region of the tubes (8) (FIG. 5). This narrowing extends over at most half, preferably over at most a third, particularly preferably over at most a quarter of the length of the tube (8) and in particular over at least two hundredths, preferably over at least one hundredth and particularly preferably over at least one fiftieth of the length of the tube (8).

A particularly preferred apparatus is one which is characterized in that the length of the cross-sectional narrowing corresponds at least to its inner diameter and it is particularly preferably at least twice as long.

In contrast to orifice plates, such a narrowing prevents the sudden drop in pressure and the sudden evaporation of any solvent present. The greater diameter compared with orifice plate designs prevents the risk of blockages in the region of the narrowing.

The additional advantages of such a design are that an improved admission pressure can be adjusted in the inlet chamber and thus a uniform distribution of the polymers over the various heat exchanger tubes can be obtained.

A very particularly preferred apparatus of the abovementioned type is one which is characterized in that the cross-sectional narrowing comprises a push-in collar in the tubes (FIG. 6).

It is advantageous where appropriate to use the poorer heat transfer between such a push-in collar in the inlet region of the tubes for keeping the temperature difference between the inflowing product stream and the inner collar wall lower than the temperature difference resulting when the apparatus is operated without a push-in collar. This effect can be intensified by using a material for the push-in collar which has a comparatively lower heat conductivity than that used for the tubes or by leaving an open gap between the heat exchanger tube and the push-in collar, or by increasing the wall thickness of the push-in collar.

However it represents a furthermore preferred embodiment of the invention, if the upper.

The invention also relates to the use of the evaporator apparatus according to the invention for removing volatile components from polymer solutions or melts.

In such use, it is preferred to orient the evaporator with the tubes positioned vertically, with the feed chamber above the tubes and the devolitilization chamber beneath the tubes.

The invention furthermore relates to a process for evaporating volatile components from polymer solutions or melts using an evaporator apparatus according to the invention, comprising the steps of preheating the polymer to a temperature of 150 to 250° C., preferably of 160 to 240° C., passing the polymer into the feed chamber at a pressure of 2,000 to 100,000 hPa, preferably of 5,000 to 50,000 hPa, passing the polymer through the tubes of the heat exchanger with heating of the tubes, preferably by means of a heat exchange medium flowing countercurrent to the polymer, to a temperature of 160 to 380° C., preferably 165 to 300° C., and evaporation and removal of the volatile compounds in the devolatilization chamber and optionally additionally in the lower section of the tubes at a pressure in the devolatilization chamber of 1 to 5,000 hPa, preferably of 2 to 2,500 hPa, particularly preferably of 5 to 1,000 hPa, and collecting and discharging the polymer.

In a preferred process the evaporation and removal of the volatile compounds are additionally effected in the lower quarter, in particular in the lower eighth, of the tubes.

Preferably, the viscosity of the polymer material on entering the feed chamber is 100 mPa·s to $10^7$ Pa·s, more preferably 500 mPa·s to 106 Pa·s, particularly preferably 1 Pa·s to 105 Pa·s.

In particular, the throughput of polymer material, based on a single tube, is 0.5 to 12 kg/h, preferably 1 to 9 kg/h.

The devolatilization can be carried out in one or more stages, in the latter case it being possible to connect a plurality of tubular heat exchangers in series or to combine them with other devolatilization apparatuses.

The tubes of the tube-bundle heat exchanger are produced, for example, from round tubes, which are brought into the shape shown in FIG. 1 with the aid of a suitable tool, for example a roll. The tubes have a cross section which changes over the length. The two ends have the in particular original round cross section of the starting tube, which, for example, has a diameter in the range of 6 mm to 450 mm, preferably of 6 mm to 50 mm, in particular of 10 mm to 40 mm. This permits fastening in conventional perforated trays (tube sheets). The cross section in the middle region of the tube corresponds approximately to that of a flat rectangular channel having round or elliptical side walls (cf. FIG. 2). The flat tubes have no seam since they are produced from one piece.

Preferably, the process according to the invention is used for heating or for devolatilizing thermoplastic polymers as a melt or solution. These polymers include all plastics which are flowable under the influence of pressure and temperature. Polycarbonate, polyamide, polypropylene, polyethylene, polyester, polystyrene, hydrogenated polystyrene, polyurethane, polyacrylate, polymethyl methacrylate, styrene/acrylonitrile, resin, poly(acrylonitrile/butadiene/styrene) and their copolymers or optionally blends of the polymers may be mentioned here by way of example. The substances and volatile compounds to be devolatilized are all solvents which can expediently be combined with the abovementioned polymers, or monomers thereof or low molecular weight oligomers, preferably chlorobenzene, methylene chloride, bisphenol A, caprolactam, styrene, acrylonitrile, toluene, ethylbenzene and cyclohexane.

When the tubular heat exchanger is used as an evaporator, the mixture enters the tube bundle as a single phase. Evaporation is permitted by a pressure gradient in the tubes, and, at the end of the apparatus, the mixture, in the form of a gas/liquid mixture, enters the separating container (devolatilization chamber), where the volatile compounds are removed as a gas. The devolatilized melt may then be further transported, for example via a pump, to a further devolatilization stage or to a granulation apparatus.

When the compact-tube heat exchanger is used as a pure heat exchanger, the tube heating is adjusted so that the product temperature of the mixture flowing in the tubes remains below the boiling point of the lowest-boiling volatile substance at the prevailing pressure.

The temperature of the heating medium is typically between 50° C. and 350° C. The exact heating temperature depends on the polymer solution to be heated or concentrated and on the desired result of concentration or on the desired product temperature.

The pressure drop established over the tube length is generally not more than 100,000 hPa.

Stainless steels, nickel-based alloys (e.g. Hastelloy®, Inconel®), titanium, aluminum and other alloys are suitable as material for the evaporator apparatus. Low-iron stainless steels are preferably used.

The process according to the invention serves for removing volatile substances, such as solvents and monomers, from a polymer solution or melt or for heating the polymer solution or melt, said process being distinguished by the following advantages in comparison with the prior art:

better heat transfer in the tubular heat exchanger between heating medium and product owing to the greater surface/volume ratio of the flat compact tubes in comparison with round tubes a shorter length of the heat exchanger owing to the better heat transfer a shorter residence time in the tubular heat exchanger owing to the shorter length and reduced volume less polymer degradation owing to the shorter residence time at high temperature and hence better quality of the end product, in particular of polymers (e.g. mechanical properties, color, processability)

lower capital costs owing to the compact design a more uniform distribution in the case of highly viscous polymer solution over the tube cross section or complete filling of the compact tubes in comparison with generally broader, known plate-type evaporator or plate-type heat exchanger.

Owing to the round cross section of the tube ends, connection to the conventional perforated trays (tube sheets) in the region of the feed chamber and of the devolatilization chamber is possible. Moreover, simple scale-up by numbering is achievable with such an apparatus.

Fundamental investigations have shown that as low a thermal load as possible is required for gentle devolatilization of polymer melts, i.e. a long residence time at low temperature or a short residence time at high temperature and at the same time a narrow residence time distribution. For reasons relating to cost-efficiency, the latter is preferable. Experimental investigations into the evaporator apparatus according to the invention led to the result that these requirements are outstandingly fulfilled by such apparatuses and hence considerable savings in the capital costs of the plant are to be expected.

The process according to the invention is used, for example, in two areas:

Evaporation processes of volatile substances in chemical reactions:
  separating off water or other low molecular weight substances in polycondensation reactions, for example in the preparation of esters, oligoesters, polyesters or polyamides
  separating off phenol in the condensation of diphenyl carbonate with aromatic bisphenols to give oligomers or polymers or
  reactions with formation of a component which can be separated off and has a high vapor pressure (HCl removal in the reaction of phosgene with alcohols to give dialkyl carbonates)
  pyrolysis reactions in which desired products vaporizable under pyrolysis conditions form, e.g. cleavage of polyesters due to macrocyclic mono- or dilactones
  pyrolysis reactions in which a reactive gaseous component is formed from the desired substance under pyrolysis conditions and is separated off, for example separation of gaseous alcohol from isocyanate obtained as condensate in the pyrolysis of urethanes Evaporation processes without chemical reaction:
  separating off volatile monomers (diisocyanates) from coating resins
  gentle solvent removal from mixtures containing thermally sensitive substances (in particular in the case of fine chemicals) and separation of solvents and of monomers from polymer solutions, in particular of chlorobenzene and/or methylene chloride from polycarbonate melts, caprolactam from polyamide melts, styrene, acrylonitrile and toluene or ethylbenzene from SAN melts or ABS melts, cyclohexane from hydrogenated-polystyrene melts separation of volatile desired substances from mixtures, for example from distillation residues separation of ethanol from alcoholic beverages The invention is explained in more detail below by way of example with reference to the figures and on the basis of an embodiment.

Figure 1:
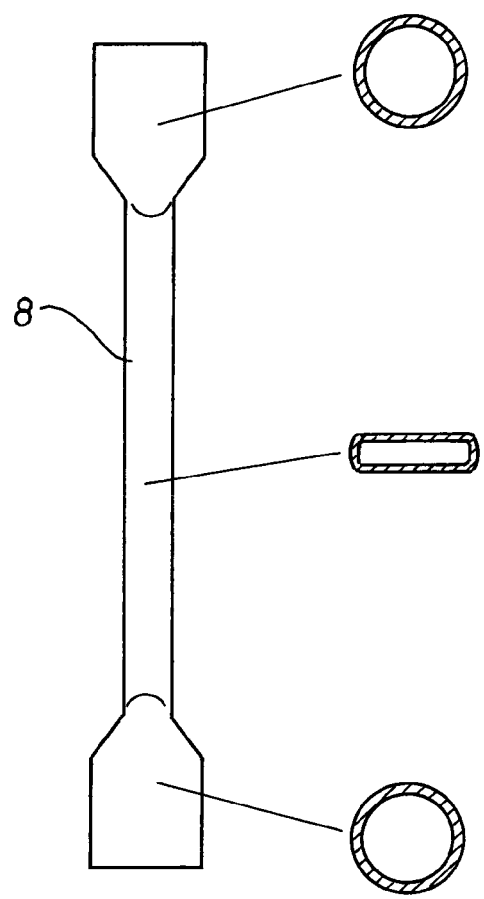
FIG. 1: illustrates the side view of a heat exchanger tube 8 having a variable tube cross section over the length
Figure 2:
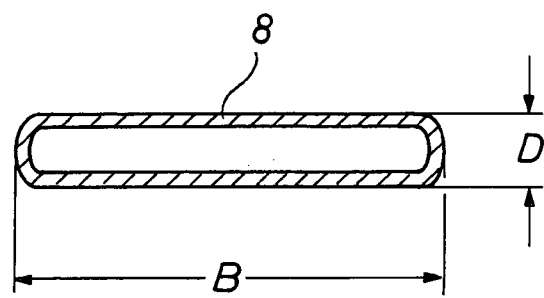
FIG. 2: illustrates the cross section of the flat tube section
Figure 3:
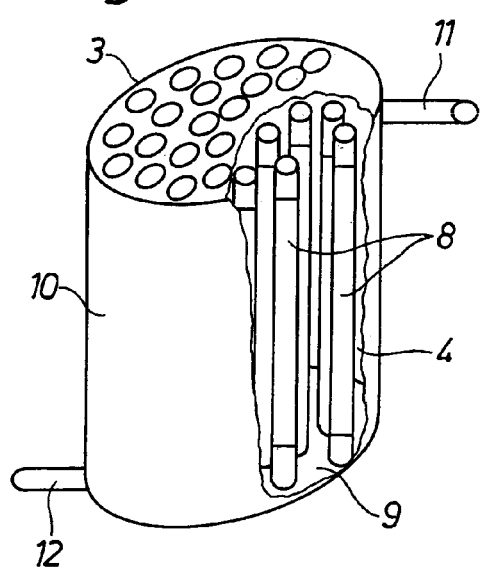
FIG. 3: illustrates the design of a tube-bundle heat exchanger

The evaporator apparatus 1 has the following design:

The heat exchanger tubes 8 arranged parallel to one another (cf. FIG. 3) are present in a shell-and-tube heat exchanger 4 having an outer jacket 10 and two perforated trays (tube sheets) 3, 9 in which the tubes 8 are fastened in such a way that a gas-tight seal forms. The tube ends are terminated by the perforated trays 3, 9. A heating medium, for example a heating oil, flows around the outside of the tubes 8, countercurrently to a polymer solution flowing through the tubes 8. In the mid-section of their lengths, the tubes 8 (cf. FIG. 1) have essentially rectangular cross-sectional shape, as shown on a larger scale in FIG. 2. The short side edges of the tubes 8 are, however, rounded. A heating oil flows into the chamber 4 at the inlet 12 and out of the chamber 4 again at the outlet 11.

Figure 4:
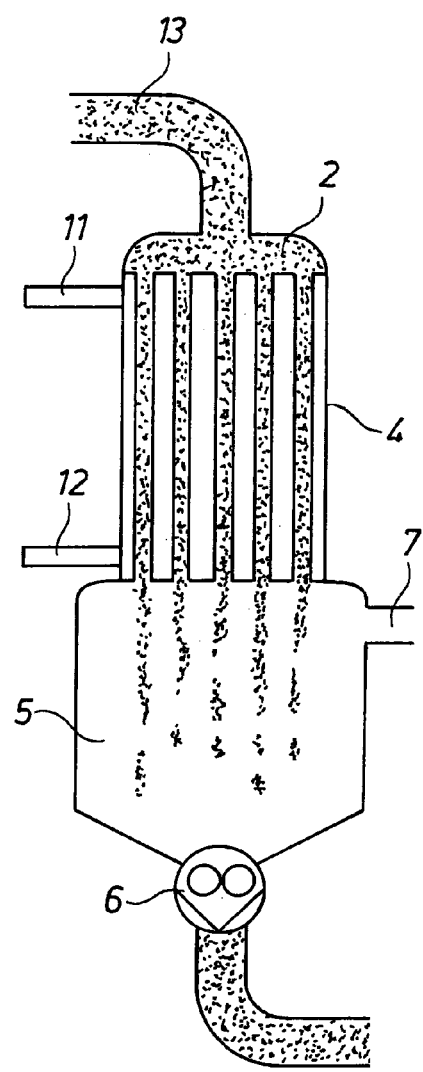
FIG. 4: illustrates the schematic overall view of the evaporator apparatus according to the invention
Figure 5:
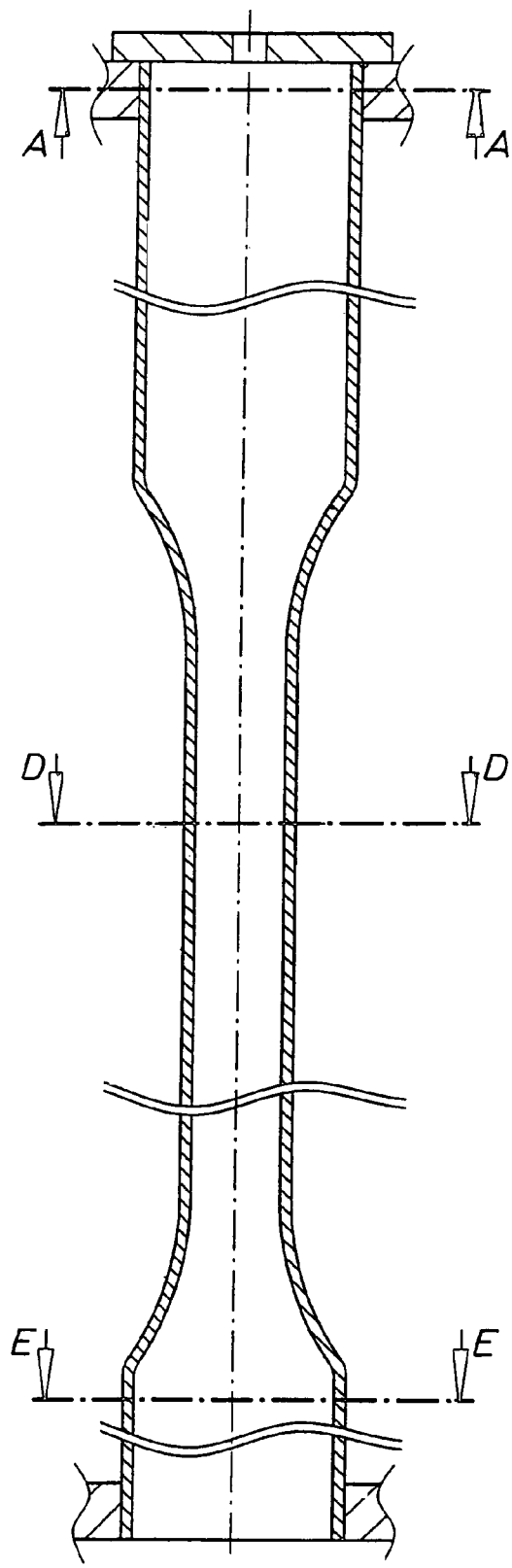
FIG. 5: illustrates a tube having a cross-sectional narrowing provided in the upper inlet region.
Figure 5:
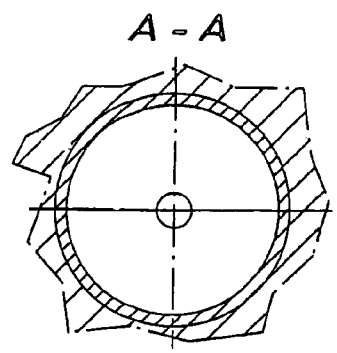
Figure 5:
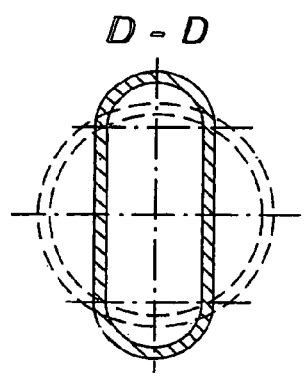
Figure 5:
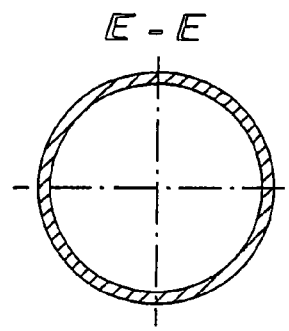
Figure 6:
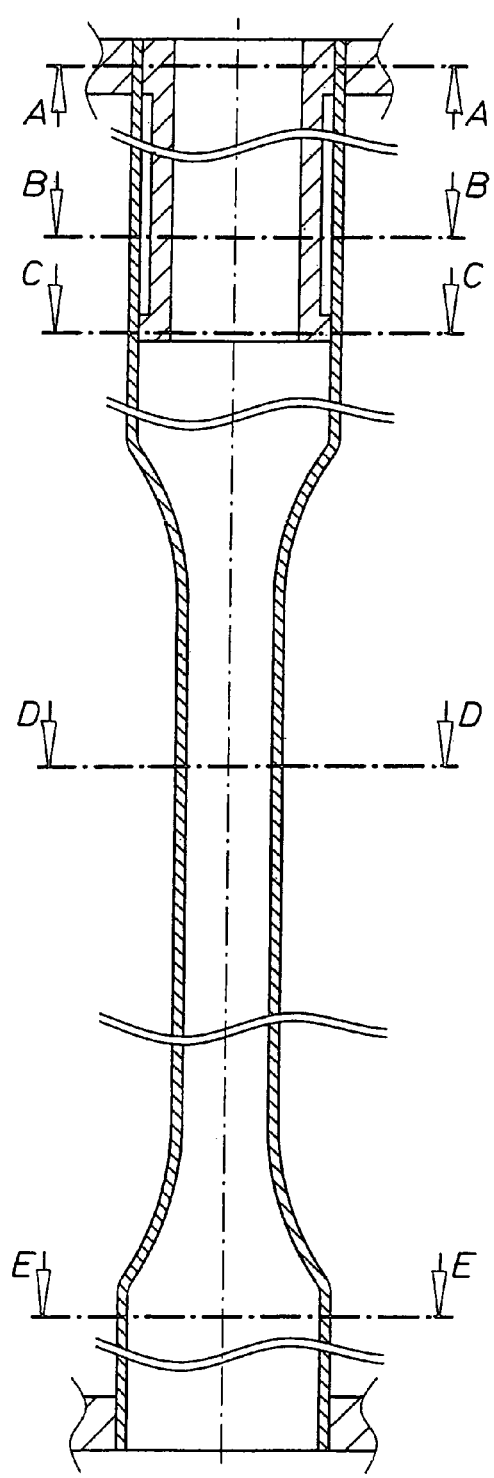
FIG. 6: illustrates a tube having a section which has been narrowed with a push-in collar.
Figure 6:
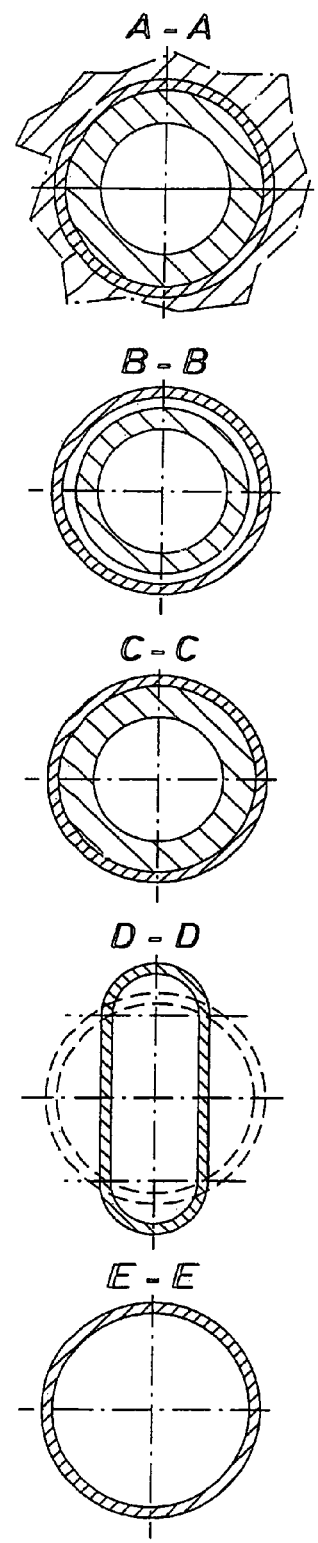

FIG. 4 shows the overall design of the evaporator apparatus. Above the upper perforated tray 3 is the feed chamber 2 with the feed pipe 13 for the polymer; the devolatilization chamber 5 with the discharge pump 6 and the vapor take-off 7 thereof for the volatile component is mounted below the lower perforated tray 9.

EXAMPLE

Removal of Volatile Components from a Polymer Solution:

A preheated polymer solution consisting of about 80% wt. ABS and about 20% wt. of monomer or solvent (acrylonitrile, styrene, ethylbenzene and methyl ethyl ketone) is transported via the feed chamber 2 with perforated tray 3 into a compact-tube heat exchanger having four tubes 8. The tubes have a total length of 1,310 mm, the flat tube region being 1,170 mm long and, in the rectangular region, having a slot thickness D of 3 mm and a slot width B of 12 mm (cf. FIG. 1). The tube 8 is heated with oil by the countercurrent method. The entry temperature of the polymer solution in the heat exchanger 4 is 195° C. The polymer solution flows with a polymer throughput of 6 kg/h downwards through the tubes 8 heated at 240° C. and leaves the tube 8 at a temperature of 226° C. A pressure drop of 52,800 hPa is established over the tube length. The volatile substances are separated from the melt in the devolatilization container 5 at 10 hPa.

Comparative experiments using an evaporator having a round tube of the same length (diameter: 10 mm) showed that, with the same throughput, a heat transfer which is better by a factor of 1.8 can be realized with the tubular heat exchanger according to the invention. Moreover, it was possible to reduce the residual content of solvents by about 33% by weight using the compact-tube heat exchanger.

I claim:

1. An evaporator apparatus (1) comprising a heat exchanger (4), said heat exchanger being comprised of a plurality of parallel heat exchanger tubes (8) surrounded by a jacket (10), each of said heat exchanger tubes having a first end and a second end, the first ends of said heat exchanger tubes being terminated at a first perforated tray (3) and the second ends of said heat exchanger tubes being terminated at a second perforated tray (9), a feed chamber adjoining said first perforated tray and a devolatilization chamber adjoining said second perforated tray, said feed chamber having an inlet, said devolatilization chamber having a discharge and a vapor outlet and said jacket having an inlet and an outlet for heat transfer media, wherein said heat exchanger tubes have a rectangular or elliptical cross-section over the greater part of their length.

2. Evaporator apparatus according to claim 1, wherein the tubes (8) of the heat exchanger (4) have a rectangular or elliptical cross section over 80 to 98% of their length.

3. Evaporator apparatus according to claim 1, wherein said cross-section has a height (D) and a width (B), and the maximum height (D) is 1 to 50 mm.

4. Evaporator apparatus according to claim 3, wherein said height (D) is from 1 to 20 mm.

5. Evaporator apparatus according to claim 1, wherein the maximum width (B) of the rectangular or elliptical cross section is from 5 to 500 mm.

6. Evaporator apparatus according to claim 5, wherein said maximum width (B) is from 7 to 100 mm.

7. Evaporator apparatus according to claim 6, wherein said maximum width (B) is from 7 to 50 mm.

8. Evaporator apparatus according to claim 1, wherein the tubes (8) have a length of from 100 mm to 10 m.

9. Evaporator apparatus according to claim 8, wherein said tube length is from 200 mm to 3 m.

10. An apparatus according to one of claims 1 to 9, wherein a cross-sectional narrowing is provided in the upper inlet region of the tubes which extends over at most half of the length of the tube, and over at least two hundredths of the length of the tube.

11. An apparatus according to claim 10, wherein the length of the cross-sectional narrowing corresponds at least to its inner diameter and it is at least twice as long.

12. An apparatus according to claim 10, wherein the cross-sectional narrowing is formed by a push-in collar (14) in the tubes (8).

13. Evaporator apparatus according to claim 9, wherein said tube length is from 500 mm to 1 m.

14. Evaporator apparatus according to claim 1, wherein the tubes (8) have a wall thickness of 0.5 to 5 mm.

15. Evaporator apparatus according to claim 14, wherein said wall thickness is from 1 to 4 mm.

16. Evaporator apparatus according to claim 1, wherein said heat exchanger tubes are formed of a material selected from the group consisting of steel, nickel alloy, aluminum and titanium.

17. Evaporator apparatus according to claim 16, wherein said heat exchanger tubes are formed of stainless steel.

18. Evaporator apparatus according to claim 1, wherein vertical wires, chains, wire loops or wire braids are mounted at the ends of the heat exchanger tubes (8) proximate the devolatilization chamber (5) and extend into the devolatilization chamber.

19. Evaporator apparatus according to claim 1, wherein the heat exchanger tubes (8) comprise a plurality of zones of different rectangular or elliptical cross-sectional areas.

20. The evaporator apparatus of claim 19, wherein the ratio of the maximum width B to the maximum thickness D of said different rectangular or elliptical cross-sectional areas is from 2:1 to 30:1.

21. The evaporator apparatus of claim 20, wherein said ratio is from 4:1 to 10:1.

22. A method for removing volatile components from polymer solutions or polymer melts which comprises devolatilizing said polymer solutions or polymer melts in an evaporator apparatus (1) comprising a heat exchanger (4), said heat exchanger being comprised of a plurality of parallel heat exchanger tubes (8) surrounded by a jacket (10), each of said heat exchanger tubes having a first end and a second end, both of which are round. the first ends of said heat exchanger tubes being terminated at a first perforated tray (3) and the second ends of said heat exchanger tubes being terminated at a second perforated tray (9), a feed chamber adjoining said first perforated tray and a devolatilization chamber adjoining said second perforated tray, said feed chamber having an inlet, said devolatilization chamber having a discharge and a vapor outlet and said jacket having an inlet and an outlet for heat transfer media, wherein said heat exchanger tubes do not have joint seams and have a rectangular or elliptical cross-section over the greater part of their length.

23. The method of claim 22, comprising the steps of preheating a polymer solution or melt to a temperature of 150 to 250° C., passing the polymer solution or melt into the feed chamber (2) of the evaporator apparatus at a pressure of 2,000 to 100,000 hPa, passing the polymer through the tubes of the heat exchanger (4) with heating of the tubes (8), optionally by passing a heat exchange medium through said jacket, to a temperature of 160 to 380° C. evaporating volatile compounds from said polymer solution or melt and removing them through the devolatilization chamber (5) at a pressure in the devolatilization chamber (5) of 1 to 5,000 hPa, and collecting and discharging the polymer.

24. The method of claim 23, wherein said polymer solution or melt is preheated to a temperature of 160 to 240° C., said pressure in said feed chamber is 5,000 to 50,000 hPa, said heat exchanger tubes are heated to a temperature of 165 to 300° C. and said pressure in said devolatilization chamber is 2 to 2,500 hPa.

25. The method of claim 24, wherein said pressure in said devolatilization chamber is 5 to 1,000 hPa.

26. Method according to claim 25, wherein the evaporation of volatile compounds takes place in the last quarter-part of the tubes closest to the devolatilization chamber.

27. The method of claim 26, wherein said evaporation takes place in the last one-eighth part of the tubes closest to the devolatilization chamber.

28. Method according to claim 23 wherein the polymer of said polymer solution or polymer melt is selected from the group consisting of polycarbonate, polyamide, polypropylene, polyethylene, polyester, polystyrene, hydrogenated polystyrene, polyurethane, polyacrylate, polymethyl methacrylate, styrene/acrylonitrile, resin, poly(acrylonitrile/butadiene/styrene), mixtures thereof, copolymers thereof and mixtures of said copolymers.

29. Method according to claim 23, wherein the volatile components are solvents or monomers or low molecular weight oligomers of the polymers of said polymer solutions or melts.

30. The method of claim 29, wherein said volatile components are selected from the group consisting of chlorobenzene, methylene chloride, bisphenol A, caprolactam, styrene, acrylonitrile, toluene, ethylbenzene and cyclohexane.

31. Method according to claim 23, wherein the viscosity of the polymer solution or melt on entering the feed chamber (2) is 100 mPa·s to $10^7$ Pa·s.

32. The method of claim 31, wherein said viscosity is, 500 mPa·s to $10^8$ Pa·s.

33. The method of claim 32, wherein said viscosity is 1 Pa·s to $10^5$ Pa·s.

34. Method according to claim 20, wherein the overall flow rate of polymer solution or melt passing through said tubes is 0.5 to 12 kg/h/tube.

35. The method of claim 34, wherein said overall flow rate is 1 to 9 kg/h/tube.

36. An apparatus according to claim 11, wherein the cross-sectional narrowing is formed by a push-in collar (14) in the tubes (8).

* * * * *